United States Patent [19]
Szermer

[11] Patent Number: 5,913,023
[45] Date of Patent: Jun. 15, 1999

[54] METHOD FOR AUTOMATED GENERATION OF TESTS FOR SOFTWARE

[75] Inventor: Wojciech Szermer, Lawrenceville, N.J.

[73] Assignee: Siemens Corporate Research, Inc., Princeton, N.J.

[21] Appl. No.: 08/885,576

[22] Filed: Jun. 30, 1997

[51] Int. Cl.$^6$ .................................................. G06F 11/25
[52] U.S. Cl. .................................. 395/183.14; 371/21.1; 371/22.1
[58] Field of Search .................. 395/183.01, 183.06, 395/183.14, 185.1; 371/20.1, 22.31, 22.5, 22.6, 27.5

[56] References Cited

U.S. PATENT DOCUMENTS

| | | | |
|---|---|---|---|
| 4,611,320 | 9/1986 | Southard | 371/20.1 |
| 4,729,096 | 3/1988 | Larson | 364/300 |
| 5,067,129 | 11/1991 | Evans et al. | 371/16.1 |
| 5,410,703 | 4/1995 | Nilsson et al. | 395/183.14 |
| 5,414,836 | 5/1995 | Baer et al. | 395/575 |
| 5,488,573 | 1/1996 | Brown et al. | 364/578 |
| 5,490,249 | 2/1996 | Miller | 395/183.14 |
| 5,500,941 | 3/1996 | Gil | 395/183.14 |
| 5,542,043 | 7/1996 | Cohen et al. | 395/183.08 |
| 5,708,773 | 1/1998 | Jeppesen III, et al. | 395/183.06 |
| 5,778,230 | 11/1995 | Wimble et al. | 395/183.14 |

OTHER PUBLICATIONS

"Independent Testing of Compiler Phases Using a Test Case Generator", Homer et al., Software—Practice and Experience, Vol. 19(1), Jan. 1989, pp. 53–62.

"TGGS: A Flexible System for Generating Efficient Test Case Generators", Guilmette, Mar. 1995, ftp://ftp. ccnet-.com/users/rfg/products/tggs/tggs–paper.ps.

"Using Attributed Grammars to Test Designs and Implementations", Duncan et al., CH1627–9/81/0000/0170500.75, 1981, IEEE, pp. 170–177.

"The Design and Implementation of a Grammar–based Data Generator", Mauer, Software—Practice and Experience, Vol. 22(3), Mar. 1992, pp. 223–244.

"An Automatic Generator For Compiler Testing", Bazzichi et al., IEEE Transactions on Software Engineering, Vol. SE–8, pp. 343–353.

"Generating Test Data with Enhanced Context —Free Grammars", Maurer, IEEE Software, 1990, pp. 50–55.

"Pushdown Automata Theory", Cohen, Copyright 1991, John Wiley & Sons, Inc., Chapter 13.

Primary Examiner—Robert W. Beausoliel, Jr.
Assistant Examiner—Pierre E. Elisca
Attorney, Agent, or Firm—Adel A. Ahmed

[57] ABSTRACT

A method for automated generation of tests for software comprises the steps of establishing a set of formal generative requirements; establishing a set of formal constraining requirements; developing information from a test case structure and encoding the structure as a context free grammar; and applying the generative requirements and the constraining requirements to indicate tests to be included in a test suite.

19 Claims, 3 Drawing Sheets

METHOD FOR AUTOMATED GENERATION OF TESTS FOR SOFTWARE

FIELD OF THE INVENTION

The present invention relates to a method for automated generation of tests for software and, more particularly, to a method for automated generation of tests for software using coverage-directed test generation.

BACKGROUND OF THE INVENTION

The testing of a complex software system typically requires a large number of test cases, generally based on a user-defined test specification. For the purpose of automated test generation, one approach is to express the test specification ina a special language or notation that embodies a representation of the structure and the format of test cases. Examples of known test generators developed primarily for the purpose of compiler testing can be found, for example, in the following: F. Bazzichi and I. Spadafora, "An Automatic Generator for Compiler Testing," IEEE Transactions on Software Engineering, Vol. SE-8, pp. 343–353, 1982; Ronald F. Guilmette, "TGGS: A Flexible System for Generating Efficient Test Case Generators", March 1995, worldwide-web document available at an ftp site (ftp://ftp.ccnet.com/users/rfg/products/tggs/tggs-paper.ps); and P. M. Maurer, "Generating Test Data with Enhanced Context-Free Grammars", IEEE Software, pp. 50–55, 1990.

One way of encoding a test specification is as a context-free grammar. Introductory and descriptive material on context-free grammar may be found, for example, in "Pushdown Automata Theory", particularly Chapter 13 thereof. Additional background material is found in William Homer et al., "Independent Testing of Compiler Phases Using a Test Case Generator", Software—Practice and Experience, Vol. 19(1), pp. 53–62, January, 1989; Peter M. Maurer, "The Design and Implementation of a Grammar-based Data Generator", Software—Practice and Experience, Vol. 23(3), pp. 223–244, March, 1992; A. G. Duncan et al., "Using Attributed Grammars to Test Designs and Implementations", CH1627-9/81/0000/0170500.75, 1981 IEEE; U.S. Pat. No. 4,729,096, entitled METHOD AND APPARATUS FOR GENERATING A TRANSLATOR PROGRAM FOR A COMPILER/INTERPRETER AND FOR TESTING THE RESULTING TRANSLATOR PROGRAM, issued Mar. 1, 1988 in the name of Larson; U.S. Pat. No. 5,067,129, entitled SERVICE PROCESSOR TESTER, issued Nov. 19, 1991 in the name of Evans et al.; U.S. Pat. No. 5,414,836, entitled SOFTWARE TESTING SYSTEM THAT EMPLOYS A GRAPHICAL INTERFACE TO GENERATE TEST CASES CONFIGURED AS HYBRID TREE STRUCTURES, issued May 9, 1995 in the name of Baer et al.

SUMMARY OF THE INVENTION

In accordance with an aspect of the invention, a method for automated generation of tests for software utilizes coverage-directed test generation and includes the steps of establishing a set of formal generative requirements; establishing a set of formal constraining requirements; developing information from a test case structure and encoding the structure as a context free grammar; and applying the generative requirements and the constraining requirements to indicate tests to be included in a test suite. In accordance with another aspect of the invention, the method comprises the steps of: parsing a test design for generating an AND/OR graph thereof; analyzing the graph so as to derive a set of simplified constraints; entering the simplified constraints into a goal management stage so as to attempt to generate a promising goal in accordance with a set of predetermined requirements and providing an output indicative of a promising goal having been generated in the event such a goal is generated and providing an output indicative of no promising goal in the event such a goal is not generated; in the event such a goal is generated, entering the promising goal into a frame synthesis process for frame synthesis that attempts to generate a frame, also referred to as a test case, that satisfies the promising goal subject to predetermined constraints and providing an output indicative of a frame having been generated in the event such a satisfactory frame is generated and providing an output indicative of no frame having been generated in the event such a satisfactory frame is not generated; in the event such a satisfactory frame is generated, storing the satisfactory frame in a database so as to update the database over a previously stored satisfactory frame, and in either event whether such a satisfactory frame is generated or not, returning to provide a further input to the goal management process; and varying any of the predetermined requirements and the predetermined constraints for enabling generation of a satisfactory frame.

In accordance with another aspect of the invention, the step of parsing a test design generates a set of data objects.

In accordance with another aspect of the invention, the method includes a step for deriving at least one of the predetermined requirements and predetermined constraints from the data objects.

In accordance with still another aspect of the invention, the goal management stage comprises the steps of: initializing a coverage goal wherein global DONT COVER requests are set in the coverage goal; determining whether the coverage goal is consistent with the predetermined constraints and, if so, providing an output indicative of the coverage goal being consistent with the predetermined constraints and, if not, indicating that the goal conflicts with the predetermined constraints; in the event the coverage goal is consistent with the predetermined constraints, selecting a coverage requirement (P,N) from a set of all requirements CR, wherein MUST COVER coverage requests for elements of P are set in the goal management, MUST COVER and DONT COVER are implied by P, AND/OR graph and the predetermined constraints are set in the goal management; a process for finding a partial solution to the predetermined constraints, and wherein TRY TO COVER requests are set in the for finding a partial solution to the predetermined constraints; in the event a goal consistent with the predetermined constraints is generated, checking whether the coverage requirement (P,N) is satisfied by generated test cases and, if so, returning to the step of initializing a coverage goal.

In accordance with another aspect of the invention, the frame synthesis process comprises the steps of: frame initialization;

selection of a most promising production to execute, subject to direction in accordance with the coverage goal; and in the event a production was selected and executed, providing an output indicative thereof and if no production could be executed, providing an output indicative thereof.

In accordance with another aspect of the invention, if no production could be executed, determining whether failures have reached a preset number limit and, if not, backtracking to the step of selection of a most promising production to execute, as described above.

In accordance with another aspect of the invention, the method comprises the steps of: updating the coverage goals; determining whether the frame synthesis is complete; if not, returning to the step of selection of a most promising production to execute as recited in claim 5, and if so, determining whether a newest frame generated is unique and if so, concluding with a successful synthesis, and if not, determining whether failures have reached a preset number limit and, if not, backtracking to the step of selection of a most promising production to execute, as described above.

In accordance with still yet another aspect of the invention, the method includes a step for deriving at least one of the predetermined requirements and predetermined constraints from the data objects.

In accordance with still yet another aspect of the invention, a method for automated generation of tests for software to a test design specification utilizing coverage-directed test generation comprises the steps of: parsing a test design for generating an AND/OR graph thereof; analyzing the graph so as to derive a set of simplified constraints; entering the simplified constraints into a goal management stage so as to attempt to generate a promising goal in accordance with a set of predetermined requirements; entering the promising goal into a frame synthesis process for frame synthesis that attempts to generate a frame or test case that satisfies the promising goal subject to predetermined constraints; and in the event such a satisfactory frame is generated, storing the satisfactory frame in a database so as to update the database over a previously stored satisfactory frame.

The invention will be better understood from the detailed description of the preferred embodiments which follows, in conjunction with the Drawing, in which

DETAILED DESCRIPTION OF THE PREFERRED EMBODIMENTS

Figure 1:
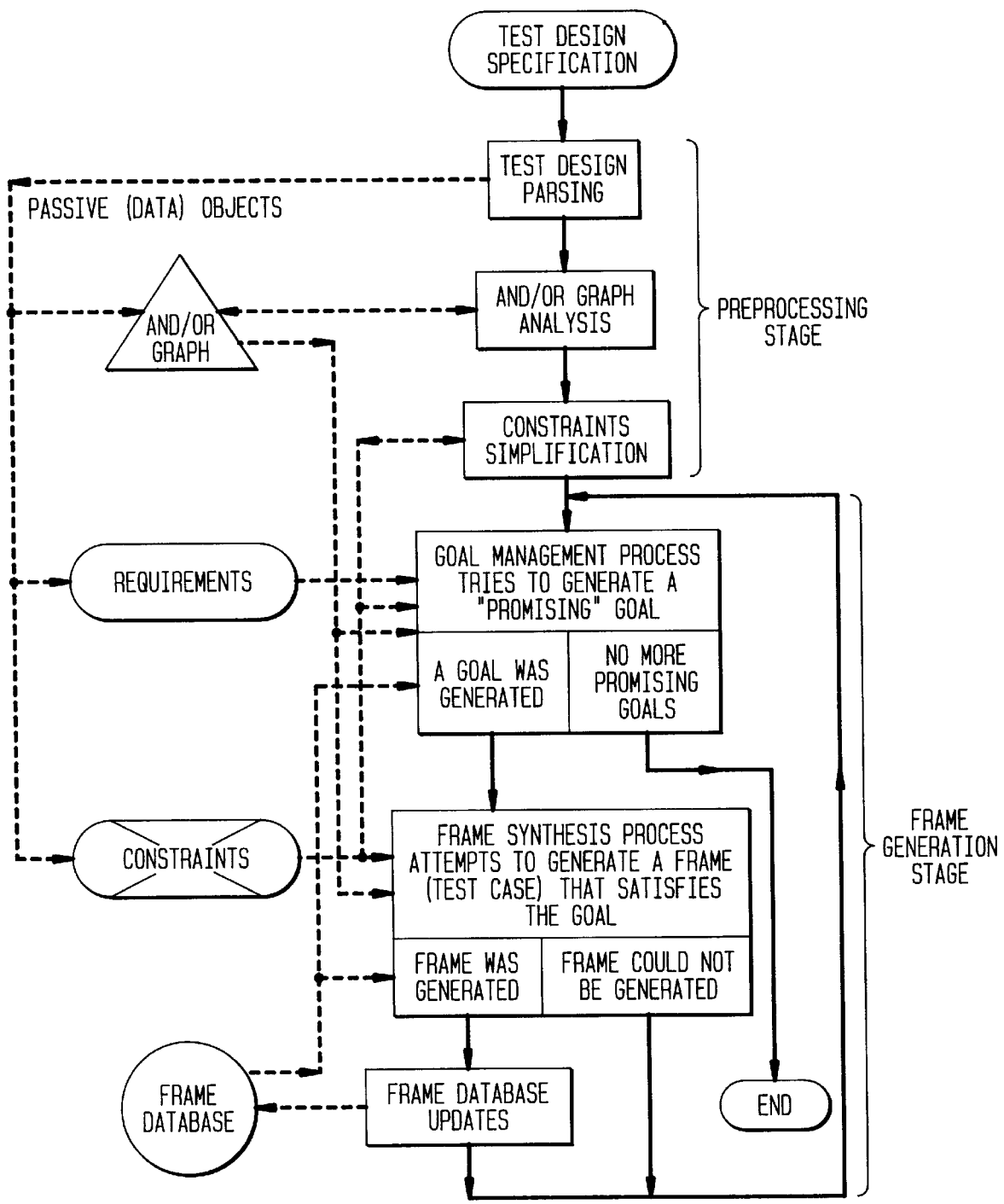
FIG. 1 shows a process flow chart of a method for coverage-directed test generation in accordance with the invention.
Figure 2:
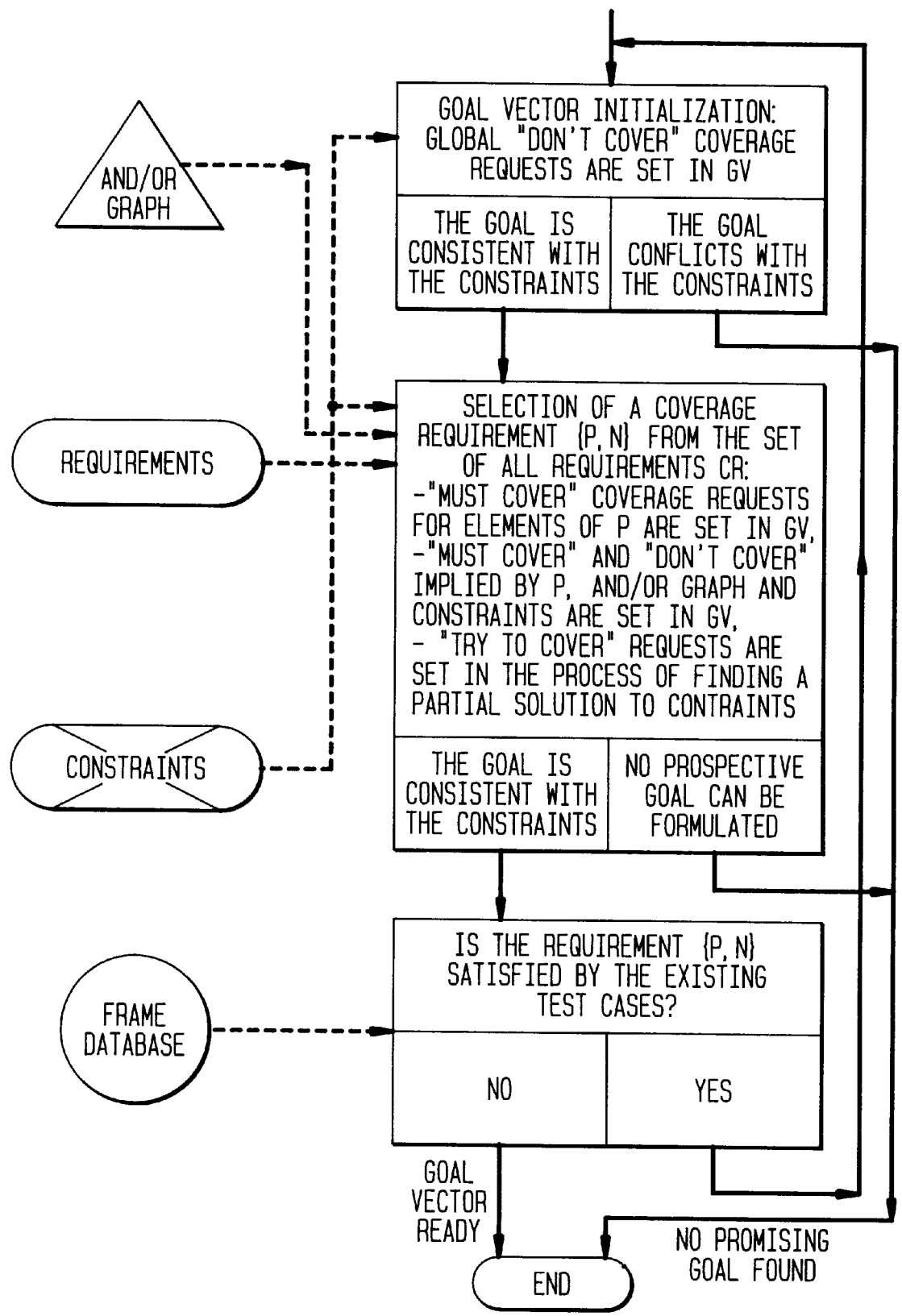
FIG. 2 shows a process flow chart of a method for goal management as utilized in an embodiment of the present invention.
Figure 3:
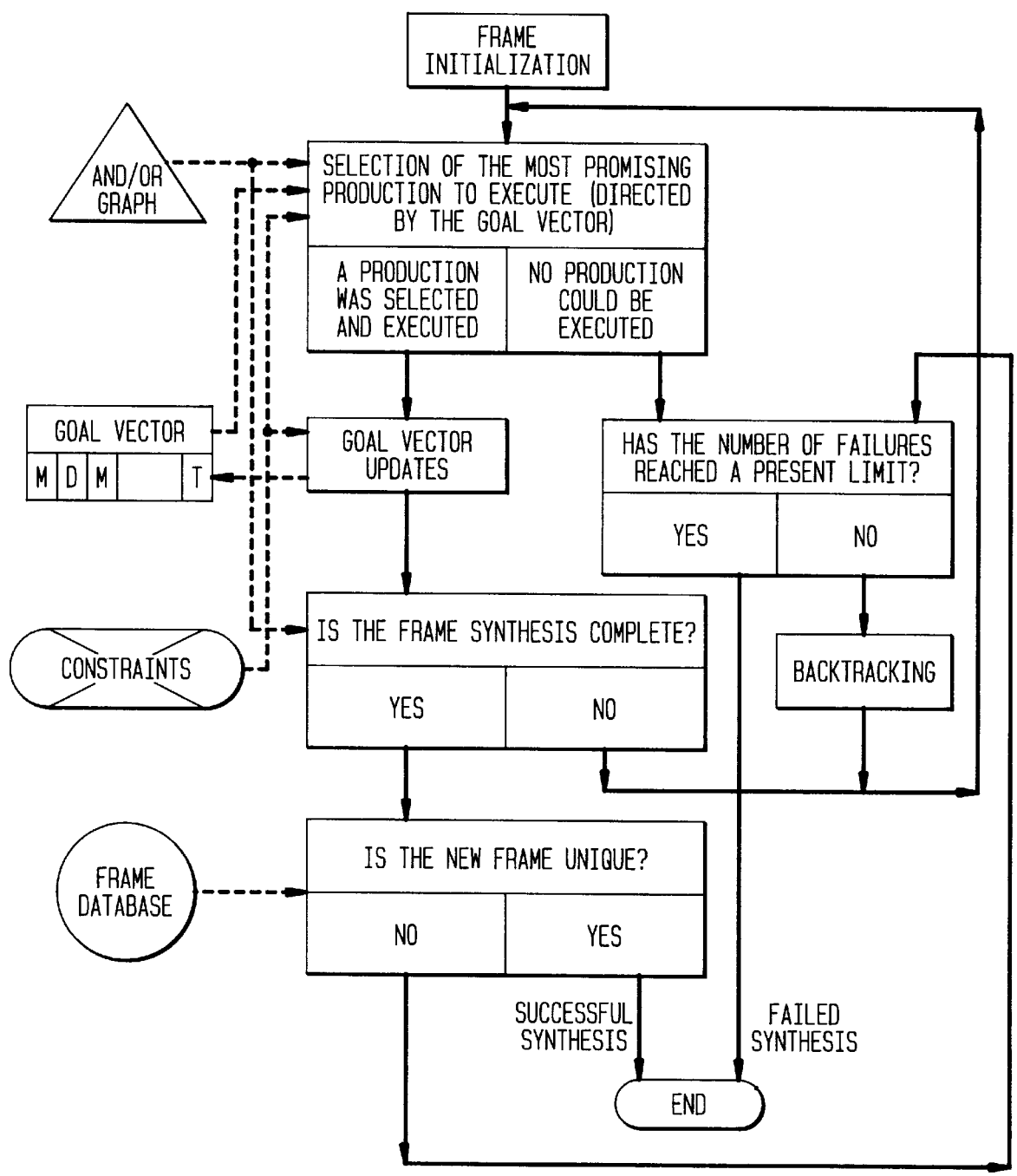
FIG. 3 shows a flow chart of a method for frame synthesis as utilized in an embodiment of the present invention.

For a grammar-based specification, the test case generation is accomplished by deriving at random a statement in the formal language specified by the grammar. The Test Specification Language (TSL) in accordance with the present invention adds another layer of complexity to test designs: constraining requirements and generative requirements, as will be explained hereinafter.

The generative requirements specify desired combinations of values of parts in a test case structure that should be covered in one or more test cases. From the functional point of view, a test case is a pair: input data is applied to a system under test and certain results are expected. From the point of view of the design, a test case has a structure comprising a series of steps where there is an alternation between inputs to the system under test and verification actions and other, auxiliary, steps.

For example, a test scenario for testing a telephone exchange could have the following structure:

1. Select a call origin number from a pool of numbers;
2. Select a call target number from the pool of numbers;
3. Set up the call origin in the "off hook" state, corresponding to lifting up the receiver of a telephone set;
4. Set up the call target in one of "off hook" or "on hook" states;
5. Originate a call from the call origin to the call target; and
6. Verify the correctness of the resulting connection.

In this example, the following generative requirement could be specified: Produce a test suite that covers all combinations of the value of the call origin number with the value of the call target number.

The constraining requirements prevent the combinatorial proliferation of numbers of test cases that can result from the generative requirements. The constraining requirements also eliminate derivations that do not represent semantically correct input data for the system to be tested.

The application of constraining and generative requirements in a test specification results in a more refined output from the test generator. It is herein recognized that the task of test generation is, however, made more difficult as a result.

Coverage-directed test generation in accordance with the present invention facilitates automatic test generation in the presence of the generative and constraining requirements.

The terminology used herein is substantially in accord with conventional usage, particularly as pertains to context-free grammars. Background material is available in the literature: see, for example, the textbook "Pushdown automata theory", by Daniel I. A. Cohen, copyright 1991 by John Wiley & Sons, Inc., particularly Chapter 13; and "Generating Test Data with Enhanced Context-Free Grammars", Peter M. Maurer, IEEE Software, pp. 50–55, July 1990.

Briefly, context-free grammars are a way to describe the format of character strings. Generally, the context-free grammar comprises an alphabet of letters called "terminals" from which strings can be made, corresponding the words of the language; a set of symbols called "nonterminals", one of which is the symbol "S" signifying a starting point; and a finite set of "productions" of the form one nonterminal→finite string of terminals and/or nonterminals where the strings of terminals and nonterminals can include only terminals, or only nonterminals, or any mixture of terminals and nonterminals or even the empty string. At least one production has the nonterminal S as its left side.

A test specification model is utilized in the coverage-directed test specification in accordance with the present invention. This comprises a grammar G which includes terminals, nonterminals, a start symbol, productions, a set of preconditions PC, a set of frame constraints FC, a set global constraints GC, and a set of coverage requirements CR. Preconditions, frame constraints and global constraints constitute constraining requirements. Generally, each nonterminal has several productions and the productions have names associated with them.

A derivation in G is a sequence of productions that transforms a start symbol S to a string of terminal symbols. In the test specification model in accordance with the invention, a derivation using G is herein referred to as test frame. A test frame is referred to as covering a production if the production is used at least once in the corresponding derivation. A test frame is said to cover a set of productions if it covers each of the productions in the set. A coverage requirement, (P,N) specifies that the set of productions in P should be covered by at least N different test frames.

An objective of the frame generation process is to generate a set of test frames following the preconditions and without violating given constraints, such that each coverage requirement is satisfied by at least one test frame. Each generated test frame must satisfy at least one coverage requirement. The test generation stops when all coverage requirements have been satisfied or when the remain coverage requirements appear to be unsatisfiable within the given resources.

Boolean expressions associated with productions and nontermials that limit their use in a derivation constitute preconditions. A nontermial can be reduced from an intermediate string of nontermials and terminals only if its precondition is satisfied. Similarly, a production can be applied to a nonterminal only if the precondition associated with that production is satisfied.

In the foregoing example relating to a telephone exchange, if the pool of test numbers were (123-1111, 123,2222, 123,3333) the step 1. Select a call origin number from a pool of numbers; can be transformed to
1. Select 123-1111 from a pool of numbers,
where the nonterminal call origin is reduced to a string of terminals by applying a production call origin→123-1111
from the set of three productions that are possible for this nonterminal.

In contrast to the preconditions, the frame constraints (FC) apply to a completed test frame. A test frame is valid only if all of the frame constraints are satisfied by the test frame.

Global constraints (GC) apply to the entire set of test frames and specify the minimum or the maximum number of frames that can cover a particular production or nonterminal. The number of times a production or nonterminal is used within a test frame is not relevant.

In addition to the constraining requirements, depth clauses attached to the nonterminals in the grammar restrict the amount of recursion in a derivation and thus make the number of possible derivations finite.

With regard to the foregoing test specification model, a principal difficulty of test generation stems from the fact that there is no facile way to determine whether there exists a test frame that covers a specified subset of productions P and what sequence of production should be used to produce such a test frame.

In a straightforward or "brute force" approach to generate frames that satisfy coverage requirements CR, it is herein recognized that one can try to create all test frames defined by grammar G and discard all those test frames that violate the constraints FC or do not cover any of the required productions. The straightforward approach is, however, impractical because of its inefficiency. Coverage-directed generation in accordance with the present invention provides a practical alternative.

All possible derivations allowed by the grammar form a tree whose root is the start symbol S and whose leaves are test frames.

The number of leaves, being test frames defined by G, grows exponentially with the number on nonterminals in the grammar. In the coverage-directed test derivation, a static analysis applied before the actual test generation as well as a group of dynamic analysis methods applied on the fly during the generation prune the tree of (all) possible derivations so that the most promising derivations are examined first and no feasible derivation is overlooked.

The static analysis provides information on dependencies between nonterminals and productions in the test specification without executing the test specification, i.e. without trying to generate tests. On the other hand, executing a constraint that is part of the specification means evaluating it for a set of variables that appear in the constraint. Static analysis methods include deriving reachability, implication, and mutual exclusion from an AND/OR graph.

The dynamic analysis includes methods for learning about dependencies between nonterminals and productions in the test specification applied for each test frame separately as it is constructed. Dynamic analysis methods include evaluating, at the Preprocessing Stage, selected constraints to find out mutually exclusive pairs of nonterminals/productions, and in the Frame Synthesis Process, look-ahead techniques for finding out which nontermials and productions are disallowed in the remaining portion of the frame, given a partially constructed test frame.

Static analysis is generally done once, as contrasted with dynamic analysis.

This allows the effective building of a "test suite" that satisfies CR or, alternatively, determine that some coverage requirements cannot be satisfied. The test suite is a collection of test cases designed for a common goal, that is, to test a given functional feature or an implementation mechanism of the system under test (SUT). The main features of the coverage-directed derivations will next be described.

The coverage-directed test generation comprises a preprocessing stage and a frame generation stage. A goal of the preprocessing stated is to derive from the test specification detailed relationships between productions and nonterminals in the grammar. The information obtained in the preprocessing stage is repeatedly used during the frame generation stage. At the frame generation stage, the elements of the set of coverage requirements CR are transformed into a sequence of coverage goals, also referred to as goal vectors. As explained, for each coverage goal, an attempt is made to synthesize a test frame that covers the goal.

The preprocessing stage begins with the creation of the AND/OR graph that encodes the grammar G from the test specification. AND nodes and OR nodes in the graph are productions and nonterminals defined in G, respectively. Nodes in the AND/OR are connected by the set of arcs whose meaning corresponds to the standard relationship between nonterminals and productions in a grammar.

The next step of the preprocessing stage is the analysis of the AND/OR graph to derive the following dependencies between productions and nonterminals in G:

reachability;
    mutual exclusion; and
    implication, by dominance and inverse dominance in the graph.
    Reachability: this signifies the relation between nonterminals and production in the grammar of the test specification, e.g. nonterminal X can be "reached" from nonterminal Y if Y can be reduced to a string on nonterminals and terminals that contains X by applying a sequence of productions and similarly for reaching a production from a nonterminal, a nonterminal from a production, and for reaching production from a production. Reachability information can be obtained by processing the AND/OR graph Mutual exclusion: this signifies a relation between productions/nonterminals in the grammar of the test specification that indicates that nonterminal/production X and nonterminal/production Y cannot appear together in the same derivation, i.e. test frame.

Dominance: a relation between productions/nonterminals in the grammar of a test specification that, in effect, states: If a partial derivation reduces the start symbol to a sequence that contains only terminal symbols and nonterminals Y, the production/nonterminal X must be in that derivation, that is, X dominates Y. Inverse dominance is a relation between productions/nonterminals in the grammar of a test specification that, in effect, states: nonterminal/production Y must appear in any subderivation that results from reducing x.

Referring again to the telephone exchange example discussed above, if a tester adds the following constraint "call origin number is different from call target". Dynamic analysis means here evaluating a constraint for different pairs of numbers. Thus, "1222-7896 number is different from 222-7896" evaluates to False. In contrast, static analysis means obtaining information without evaluating the constraint. For example, the result of static analysis might be "the constraint binds variables call origin and call target".

The constraints analysis and simplification has both a static and a dynamic component. It allows for further refinement of relations derived from the AND/OR graph and converts the set of constraints to a form that makes the constraint evaluation at the frame generation stage more efficient. An example of refinement is as follows: analysis of the AND/OR graph produces pairs X implies Y. Additional pairs might be derived through analysis of constraints. Informally, a constraint can be stated to be an expression composed of statements of the type: "production X is in test frame", "nontermial Y is in test frame", and logical operators such as OR, AND, NOT. A set of constraints can be viewed as one expression in which individual constraints are connected by the AND operator. The time taken to evaluate an expression depends on the way the expression is represented in the computer memory and the method utilized for the evaluation of constraints. Thus, there is not a single "best form", but the form depends on the method used in the evaluation.

At the frame generation stage, the goal management process chooses one or more coverage requirements (P,N) from set CR and creates a coverage goal. The coverage goal is a set of pairs {grammar element, coverage request} where the grammar element is nonterminal or production from G and the coverage request is either "must be covered" or "cannot be covered" or "should be considered for coverage". The coverage goal is passed to the frame synthesis process.

The coverage goal plays an important role in the coverage-directed test generation. As explained, it is formed by the Goal Management Process and specifies structural requirements for a new frame (or test case) to be created by the Frame Synthesis Process.

In the coverage goal, a coverage request is specified for each nonterminal and each production in the grammar of test design. A coverage request for a grammar element ge (production or nonterminal) can be one of the following:

MUST COVER (M), ge must be used in the frame derivation; TRY TO COVER (T), it is recommended but not necessary to use ge;

DO NOT COVER (D), ge cannot be used in the structure of a new test case; and UNIMPORTANT (u), it does not matter whether ge is used or not.

See Table 1 for a summary representation. Structural coverage requests expressed in the Coverage Goal contain the following information:

One or more elementary coverage requirements from the set of requirements CR;

a partial solution to the constraints satisfaction problem defined by Frame Constraints and global constraints; and directions for using the grammar to produce a complete and unique frame.

TABLE 1

| GOAL VECTOR | | | | | | |
|---|---|---|---|---|---|---|
| NONTERMINALS | | | | PRODUTIONS | | |
| $n_1$ | $n_2$ | $n_3$ | $n_K$ | $p_1$ | $p_2$ | $p_L$ |
| M | u | D | M | D | u | T |

The frame synthesis process attempts to build a derivation that meets the goal. The frame generation continues until the goal management process exhausts all possibilities of creating a promising coverage goal. The effectiveness of the frame generation is ensured by a set of techniques employed both at the goal management and the frame synthesis level. The set of techniques comprises, in the goal management process, to set values of the coverage goal and in the frame synthesis process, to select a sequence of productions according to the coverage goal and to update the coverage goal with additional information implied by each choice of a production.

A "promising coverage goal" is a coverage goal derived from coverage requirements that does not violate any constraints. The goal is evaluated by verifying elementary requirements stated in the goal against the set of constraints; for example: "production/nonterminal X must be covered, i.e. be in the current test frame", or "production/nonterminal Y cannot be covered, i.e. be in the current test frame". If a conflict is detected, that is goal and constraints cannot be true at the same time, the coverage goal is not promising.

The goal management process generates the coverage goals during a systematic search of the set of coverage requirements CR.

Coverage goals are created from coverage requirements by judicious ordering of nontermials that appear on the left hand side of productions specified in the requirements, constraints and dependencies from the AND/OR graph being taken into account, and by building coverage goals incrementally in that order. At the goal management level, savings in computational effort are achieved by forming coverage goals in a selective way, for a promising subset of requirements from CR only. Each time a pair {grammar element, coverage request} is added to a {partial} coverage goal, the coverage goal is checked against a subset of constraints. It is noted that not all constraints refer to the added element. if a conflict with constraints is detected, all requirements that include that partial coverage goal are discarded.

The frame synthesis process is a systematic depth first search in the tree of possible frame derivations. The search is driven by the coverage goal and makes use of a set of dependencies obtained at the preprocessing stage to find a prospective derivation with the set of constraining requirements PC, FC, and GC. A prospective derivation is a partial derivation that does not violate the constraints and does not exclude the possibility of satisfying the coverage goal for which it is created.

The present invention has been described by way of exemplary embodiments. It will be understood that one of skill in the art to which it pertains will be able to make changes and substitutions which merely provide equivalent functions to those utilized in connection with the embodiments described herein. Such changes and substitutions do not depart from the spirit of the invention whose scope is only limited by the claims following.

What is claimed is:

1. A method for automated generation of tests for software to a test design specification, said method utilizing coverage-directed test generation, comprising the steps of:

parsing a test design for generating an AND/OR graph thereof;

analyzing said graph so as to derive a set of simplified constraints;

entering said simplified constraints into a goal management stage so as to attempt to generate a promising goal in accordance with a set of predetermined requirements and providing an output indicative of a promising goal having been generated in the event such a goal is generated and providing an output indicative of no promising goal in the event such a goal is not generated;

in the event such a goal is generated, entering said promising goal into a frame synthesis process for frame synthesis that attempts to generate a frame or test case that satisfies said promising goal subject to predetermined constraints and providing an output indicative of a frame having been generated in the event such a satisfactory frame is generated and providing an output indicative of no frame having been generated in the event such a satisfactory frame is not generated;

in the event such a satisfactory frame is generated, storing said satisfactory frame in a database so as to update said database over a previously stored satisfactory frame, and in either event whether such a satisfactory frame is generated or not, returning to provide a further input to said goal management process; and varying any of said predetermined requirements and said predetermined constraints for enabling generation of a satisfactory frame.

2. A method for automated generation of tests for software in accordance with claim 1, wherein said step of parsing a test design generates a set of data objects.

3. A method for automated generation of tests for software in accordance with claim 2, including a step for deriving at least one of said predetermined requirements and predetermined constraints from said data objects.

4. A method for automated generation of tests for software in accordance with claim 2, including a step for deriving at least one of said predetermined requirements and predetermined constraints from said data objects.

5. A method for automated generation of tests for software in accordance with claim 1, wherein said goal management stage comprises the steps of:

initializing a coverage goal wherein global DONT COVER requests are set in said coverage goal;

determining whether said coverage goal is consistent with said predetermined constraints and, if so, providing an output indicative of said coverage goal being consistent with said predetermined constraints and, if not, indicating that said goal conflicts with said predetermined constraints;

in the event said coverage goal is consistent with said predetermined constraints, selecting a coverage requirement (P,N) from a set of all requirements CR, wherein MUST COVER coverage requests for elements of P are set in said goal management, MUST COVER and DONT COVER are implied by P, AND/OR graph and said predetermined constraints are set in said goal management;

a process for finding a partial solution to said predetermined constraints, and wherein TRY TO COVER requests are set in said for finding a partial solution to said predetermined constraints;

in the event a goal consistent with said predetermined constraints is generated, checking whether said coverage requirement (P,N) is satisfied by generated test cases and, if so, returning to said step of initializing a coverage goal.

6. A method for automated generation of tests for software in accordance with claim 1, wherein said frame synthesis process comprises the steps of:

frame initialization;

selection of a most promising production to execute, subject to direction in accordance with said coverage goal; and in the event a production was selected and executed, providing an output indicative thereof and if no production could be executed, providing an output indicative thereof.

7. A method for automated generation of tests for software in accordance with claim 6, wherein, if no production could be executed, determining whether failures have reached a preset number limit and, if not, backtracking to said step of selection of a most promising production to execute, as recited in claim 5.

8. A method for automated generation of tests for software in accordance with claim 6, wherein if a production was selected and executed said method comprises the steps of:

updating said coverage goals;

determining whether said frame synthesis is complete;

if not, returning to said step of selection of a most promising production to execute as recited in claim 5, and if so, determining whether a newest frame generated is unique and if so, concluding with a successful synthesis, and if not, determining whether failures have reached a preset number limit and, if not, backtracking to said step of selection of a most promising production to execute, as recited in claim 5.

9. A method for automated generation of tests for software in accordance with claim 6, wherein said step of parsing a test design generates a set of data objects.

10. A method for automated generation of tests for software in accordance with claim 9, including a step for deriving at least one of said predetermined requirements and predetermined constraints from said data objects.

11. A method for automated generation of tests for software in accordance with claim 1, wherein said goal management stage comprises the steps of:

initializing a coverage goal wherein global DONT COVER requests are set in said coverage goal;

determining whether said coverage goal is consistent with said predetermined constraints and, if so, providing an output indicative of said coverage goal being consistent with said predetermined constraints and, if not, indicating that said goal conflicts with said predetermined constraints;

in the event said coverage goal is consistent with said predetermined constraints, selecting a coverage requirement (P,N) from a set of all requirements CR, wherein MUST COVER coverage requests for elements of P are set in said goal management, MUST COVER and DONT COVER are implied by P, AND/OR graph and said predetermined constraints are set in said goal management;

a process for finding a partial solution to said predetermined constraints, and wherein TRY TO COVER requests are set in said for finding a partial solution to said predetermined constraints;

in the event a goal consistent with said predetermined constraints is generated, checking whether said coverage requirement (P,N) is satisfied by generated test cases and, if so, returning to said step of initializing a coverage goal.

12. A method for automated generation of tests for software to a test design specification, said method utilizing coverage-directed test generation, comprising the steps of:

parsing a test design for generating an AND/OR graph thereof;

analyzing said graph so as to derive a set of simplified constraints;

entering said simplified constraints into a goal management stage so as to attempt to generate a promising goal in accordance with a set of predetermined requirements;

entering said promising goal into a frame synthesis process for frame synthesis that attempts to generate a frame or test case that satisfies said promising goal subject to predetermined constraints; and in the event such a satisfactory frame is generated, storing said satisfactory frame in a database so as to update said database over a previously stored satisfactory frame.

13. A method for automated generation of tests for software in accordance with claim 12, comprising a step of returning to provide a further input to said goal management process; and varying any of said predetermined requirements and said predetermined constraints for enabling generation of a satisfactory frame.

14. A method for automated generation of tests for software in accordance with claim 12, wherein said step of parsing a test design generates a set of data objects.

15. A method for automated generation of tests for software in accordance with claim 12, wherein said frame synthesis process comprises the steps of:

frame initialization;

selection of a most promising production to execute, subject to direction in accordance with said coverage goal; and in the event a production was selected and executed, providing an output indicative thereof and if no production could be executed, providing an output indicative thereof.

16. A method for automated generation of tests for software in accordance with claim 15, wherein, if no production could be executed, determining whether failures have reached a preset number limit and, if not, backtracking to said step of selection of a most promising production to execute, as recited in claim 5.

17. A method for automated generation of tests for software in accordance with claim 15, wherein if a production was selected and executed said method comprises the steps of:

updating said coverage goals;

determining whether said frame synthesis is complete;

if not, returning to said step of selection of a most promising production to execute as recited in claim 5, and if so, determining whether a newest frame generated is unique and if so, concluding with a successful synthesis, and if not, determining whether failures have reached a preset number limit and, if not, backtracking to said step of selection of a most promising production to execute, as recited in claim 5.

18. A method for automated generation of tests for software in accordance with claim 15, wherein said step of parsing a test design generates a set of data objects.

19. A method for automated generation of tests for software in accordance with claim 18, including a step for deriving at least one of said predetermined requirements and predetermined constraints from said data objects.

* * * * *